United States Patent [19]

Asayama

[11] Patent Number: 4,478,087
[45] Date of Patent: Oct. 23, 1984

[54] KÁRMÁN'S VORTEX STREET FLOW METER
[75] Inventor: Yoshiaki Asayama, Himeji, Japan
[73] Assignee: Mitsubishi Denki Kabushiki Kaisha, Tokyo, Japan
[21] Appl. No.: 420,295
[22] Filed: Sep. 20, 1982
[51] Int. Cl.³ ............................................... G01F 1/32
[52] U.S. Cl. .................................. 73/861.22; 73/118.2
[58] Field of Search ............. 73/118 A, 861.22–861.24
[56] References Cited

U.S. PATENT DOCUMENTS 3,572,117  3/1971  Rodely .
3,589,185  6/1971  Burgess .
3,881,352  5/1975  McShane .
3,956,928  5/1976  Barrera .
3,965,730  6/1976  Innes .
4,173,143 11/1979  Venton-Walters .............. 73/861.22

FOREIGN PATENT DOCUMENTS 0023497  2/1980  Japan .............................. 73/861.22

Primary Examiner—Charles A. Ruehl
Attorney, Agent, or Firm—Wenderoth, Lind & Ponack

[57] ABSTRACT

A Kármán's vortex street flow meter has two conduits through which a fluid to be measured flows, a vortex generating portion disposed at a junction where those portions of the fluid flowing through the respective conduits join each other, a plurality of vortex stabilizers disposed at predetermined equal intervals downstream of the vortex generating portion, and a detector for detecting the frequency at which vortices of a Kármán's vortex street are generated downstream of the vortex generating portion to sense the flow speed or the flow rate of the fluid.

10 Claims, 7 Drawing Figures

KÁRMÁN'S VORTEX STREET FLOW METER

BACKGROUND OF THE INVENTION

This invention relates to a Kármán's vortex street flow meter comprising a pair of conduits having a fluid to be measured introduced thereinto, and a detector for detecting the flow rate or flow speed of the measured fluid by detecting a frequency at which vortices of a Kármán's vortex street are generated downstream of a junction where the measured fluid flowing through one of the conduits joins that flowing through the other conduit.

There have been already proposed a variety of types of the so-called Kármán's vortex street flow meters comprising a conduit having a fluid to be measured flowing therethrough, a vortex generating rod immersed in the fluid flowing through the conduit perpendicularly to the direction of flow of the fluid to generate a Kármán's vortex street downstream of the rod and a detector for detecting the frequency at which vortices of the Kármán's vortex street are generated thereby to measure the flow rate or flow speed of the fluid.

Flow meters of the types referred to are disclosed and claimed, for example, in Japanese patent publication Nos. 1905/1969 and 9069/1981 and put to practical use as industrial measurement devices. There are also known a variety of types of a sucked air detector comprising the Kármán's vortex street flow meter as described above utilized to detect the amount of air sucked into an associated internal combustion engine. Those sucked air detectors are disclosed and claimed, for example, in Japanese laid-open utility model application No. 5008/1975, Japanese laid-open patent application No. 130718/1976 and put to practical use. One of the conventional sucked air detectors has comprised a Kármán's vortex street flow meter such as disclosed above, and an air cleaner disposed upstream of the Kármán's vortex street flow meter to clean sucked air passed through an air introduction port. The sucked air introduced into the Kármán's vortex steet flow meter has been arranged to flow along a minimum length flow path between the air introduction port and the inlet port of the Kármán's vortex street flow meter. In other words, the sucked air has flowed through the central portion of the air cleaner in a concentrated manner. As a result, only that central portion of the air cleaner has been used to filter the air and has become greatly contaminated and also may oftentimes be deformed by the stream of the sucked air.

Furthermore it has been known to use the Kármán's vortex street flow meter as described above to detect the flow rate of a fluid flowing in a pair of different directions through respective conduits. In the latter case the flow rate of the fluid has been detected either by disposing the Kármán's vortex street flow meter in each of the conduits or by disposing the Kármán's vortex street flow meter in a conduit following a junction where the fluid portions flowing through the respective conduits have joined each other. It is well known that, in order to rectify the measured fluid introduced thereinto, Kármán's vortex street flow meters are required to include a conduit on the upstream side thereof having a length equal to at least five times the diameter of the conduit for the same and a conduit on the downstream side thereof having a length equal to about three times that diameter. Thus the use of the Kármán's vortex street flow meters as described above has been disadvantageous in that the conduit therefor becomes long.

Accordingly it is an object of the present invention to provide a new and improved Kármán's vortex street flow meter including a vortex generating portion having a structure which is inexpensive and simple as compared with the prior art structure.

It is another object of the present invention to provide a new and improved sucked air detector utilizing the Kármán's vortex street flow meter as described in the preceding paragraph to detect an amount of air sucked into an internal combustion engine.

SUMMARY OF THE INVENTION

The present invention provides a Kármán's vortex street flow meter comprising a pair of conduits into which a fluid to be measured is introduced, a vortex generating portion disposed at a junction where portions of the measured fluid flowing through the conduits respectively join each other, and the detector for detecting a frequency at which vortices of a Kármán's vortex street are generated downstream of the vortex generating portion thereby to sense the flow speed or the flow rate of the fluid to be measured.

In a preferred embodiment of the present invention, the vortex generating portion is formed of one part of the walls of the pair of conduits and a plurality of vortex stabilizers in the form of strips or rods are disposed downstream of the vortex generating portion to stabilize the generation of the vortices downstream of the vortex generating portion.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENTS

Figure 1:
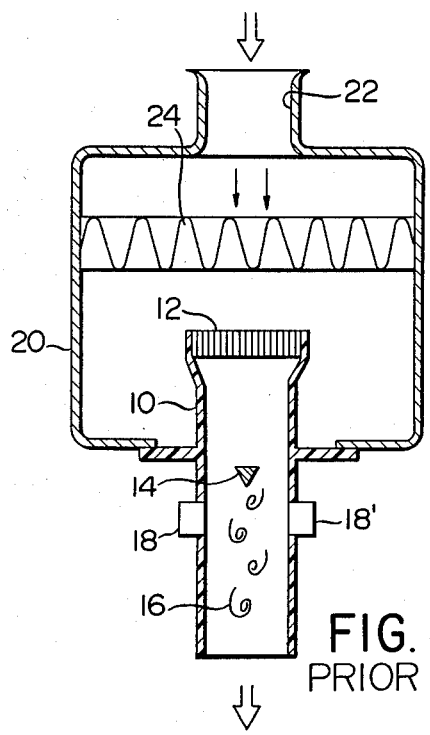
FIG. 1 is a longitudinal sectional view of a sucked air detector including a conventional Kármán's vortex street flow meter to detect an amount of air sucked into an associated internal combustion engine.

Referring now to FIG. 1 of the drawings, there is illustrated a sucked air detector including a conventional Kármán's vortex street flow meter to detect the amount of air sucked into an associated internal combustion engine. The arrangement illustrated comprises a conventional Kármán's vortex street flow meter including the main body 10 in the form of a conduit composed of a plastic material, an aluminum rectifier 12 disposed in an inlet port of the main body 10, a vortex generating rod 14 extending across the main body so as to be immersed in the fluid flowing therethrough, in this case, sucked air flowing through the conduit 10 to generate a Kármán's vortex street 16 downstream thereof and a vortex detector consisting, for example, of an ultrasonic transmitter 18 and an ultrasonic receiver 18' disposed in opposed relationship on the opposite wells of the conduit 10 downstream of the vortex generating rod 14 with the Kármán's vortex street therebetween.

The main body or conduit 10 includes an inlet portion with the rectifier 12 extending into a sucked air receiver 20 of sheet iron so that the rectifier 12 is opposed to an air introduction port 22 with an air cleaner 24 therebetween which, in turn, divides the receiver into a pair of compartments. The air cleaner 24 is formed of unwoven cloth.

In operation, sucked air is introduced into the receiver 20 through the air introduction port 22 and then cleaned by the air cleaner 24 after which the air enters into Kármán's vortex street flow meter and the flow rate thereof is measured by the vortex detector 18-18' in the manner well known in the art.

In the arrangement of FIG. 1, the sucked air flows along a minimum length path between the air introduction port 22 and the rectifier 12 in the inlet port of the conduit 10. Thus the sucked air flowing through the air cleaner is concentrated at the central portion thereof. As a result, the central portion of the air cleaner 24 becomes very contaminated and also may be deformed by the concentrated flow of the sucked air.

The present invention seeks to eliminate the abovementioned disadvantages of the arrangement shown in FIG. 1.

Figure 3:
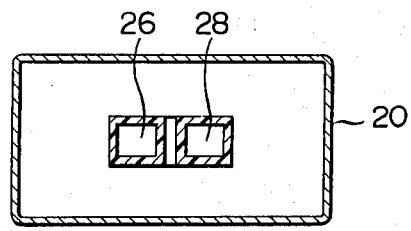
FIG. 3 is a cross sectional view of the arrangement shown in FIG. 2 with the section taken on the line III—III of FIG. 2.
Figure 4:
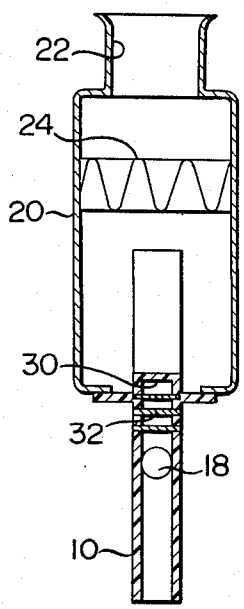
FIG. 4 is a longitudinal sectional view of the arrangement shown in FIG. 2 with section taken on line IV—IV of FIG. 2.
Figure 2:
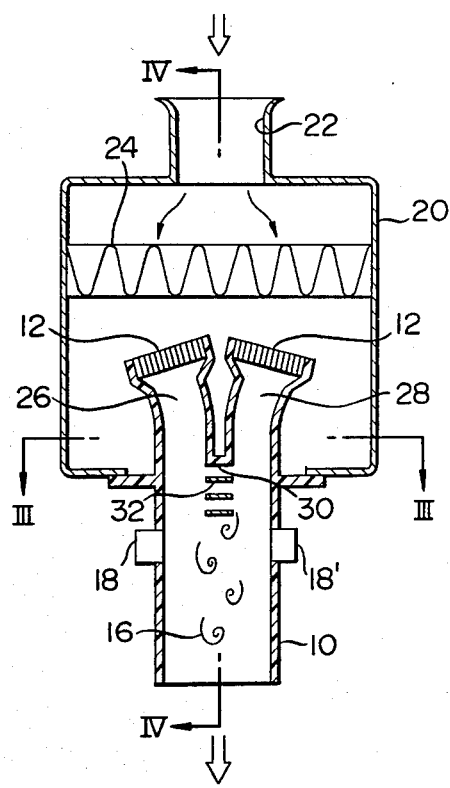
FIG. 2 is a longitudinal sectional view of one embodiment of a sucked air detector including the Kármán's vortex street flow meter according to the present invention to detect an amount of air sucked into an associated internal combustion engine.

FIGS. 2, 3 and 4 show one embodiment of a sucked air detector including the Kármán's vortex street flow meter according to the present invention which detects the amount of air sucked into an associated internal combustion engine. The arrangement illustrated comprises the Kármán's vortex street flow meter including the main body 10 in the form of a rectangular cross-section conduit having that portion thereof extending into the sucked air receiver 20 having a rectangular cross section forked into a pair of somewhat diverged conduit portions 26 and 28 which are, in turn, provided at the upper ends as viewed in FIG. 2 with respective rectifiers 12. As in the arrangement of FIG. 1, the rectangular conduit is formed of a plastic material. As shown in FIG. 3, the conduit portions 26 and 28 each have a rectangular cross section substantially equal in area to each other and have the lower ends as viewed in FIG. 2 merged into the main body or conduit 10 so that the adjacent walls thereof have lower ends connected to each other through a connecting wall 30 substantially perpendicular to the longitudinal axis of the conduit 10 to form a vortex generating portion. In other words, the vortex generating portion is formed of one part of the walls of the conduit portions.

Then a plurality of vortex stabilizers 32 formed of a metallic material, in this case three stabilizers, are disposed at predetermined equal intervals below the connecting wall 30 within the conduit 10, with the uppermost stabilizer spaced from the connecting wall 30 by a predetermined interval which may be equal to the predetermined equal intervals. Each of the vortex stabilizers 32 is in the form of a strip substantially equal in width to the connecting wall 30 and centered on the longitudinal axis of the conduit 10 (see FIG. 2) while being suitably fixed at both ends to a pair of opposite longer walls of the conduit 10 (see FIG. 4).

In other respects the arrangement shown in FIGS. 2, 3 and 4 is identical to that illustrated in FIG. 1.

When the associated internal combustion engine (not shown) is started, air sucked into the engine passes through the air introduction port 22 and then the air cleaner 24 where it is cleaned. Then the air is rectified by the rectifiers 12 and the rectified air is introduced into the pair of conduit portions 26 and 28. When those portions of the rectified air introduced into the conduit portions 26 and 28 respectively join each other, vortices are generated by the vortex generating portion 30. At that time the vortex stabilizers 32 function to maintain the generation of the vortices continuous and stable. Thus there are generated downstream of the lowermost vortex stabilizer 32 periodic vortices corresponding to a flow speed or flow rate of the sucked air resulting in the formation of a stable Kármán's vortex street 16. Then the vortex detector 18-18' detects the frequency at which the vortices of the Kármán's vortex street 16 are generated resulting in the detection of the flow speed or flow rate of the sucked air. Thereafter the sucked air is introduced into the engine.

From the foregoing it is seen that, since the sucked air flowing through the air introduction port 22 is divided into a pair of streams thereof flowing through the conduit portions 26 and 28 respectively, the same is prevented from being concentrated at a single point upon its passage through the air cleaner 24. Therefore the air cleaner 24 is prevented from being locally overly contaminated and also from being deformed due to a concentrated stream of the sucked air.

Also the vortex generating portion 30 is disposed at the junction where those portions of the sucked air flowing through the conduit portions 26 and 28 respectively join each other and vortices are apt to be generated, so that one part of the walls of the conduit portions 26 and 28 can be utilized as the vortex generating portion 30 resulting in a simplified structure. Furthermore the rectangular cross section of the conduit portions 26 and 28 is effective for forming the vortex generating portion 30 and the vortex stabilizers 32 are effective particularly with a large change in flow rate of air sucked into an associated internal combustion engine. That is, the flow rate can be detected over a wide range.

Figure 5:
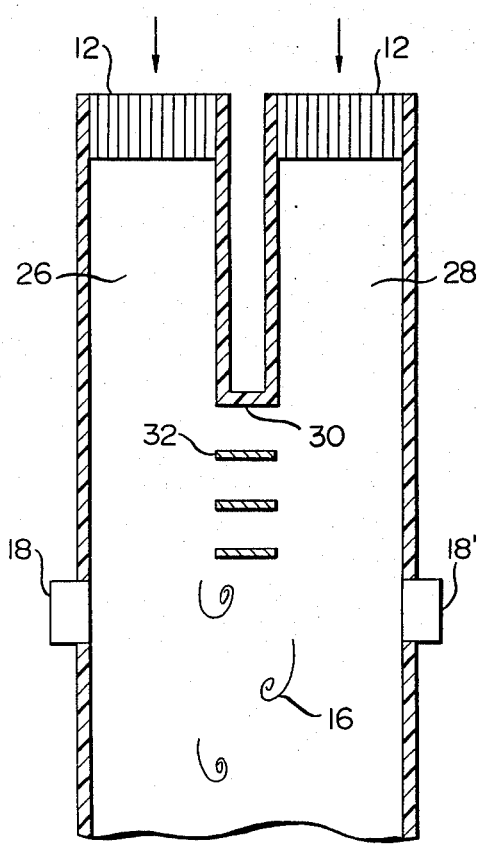
FIG. 5 is a longitudinal sectional view of a modification of the present invention.

FIG. 5 shows a modification of the present invention. The arrangement illustrated is different from that shown in FIGS. 2, 3 and 4 only in that in FIG. 5 the pair of conduit portions 26 and 28 extend parallel to the longitudinal axis of the conduit 10.

Figure 6:
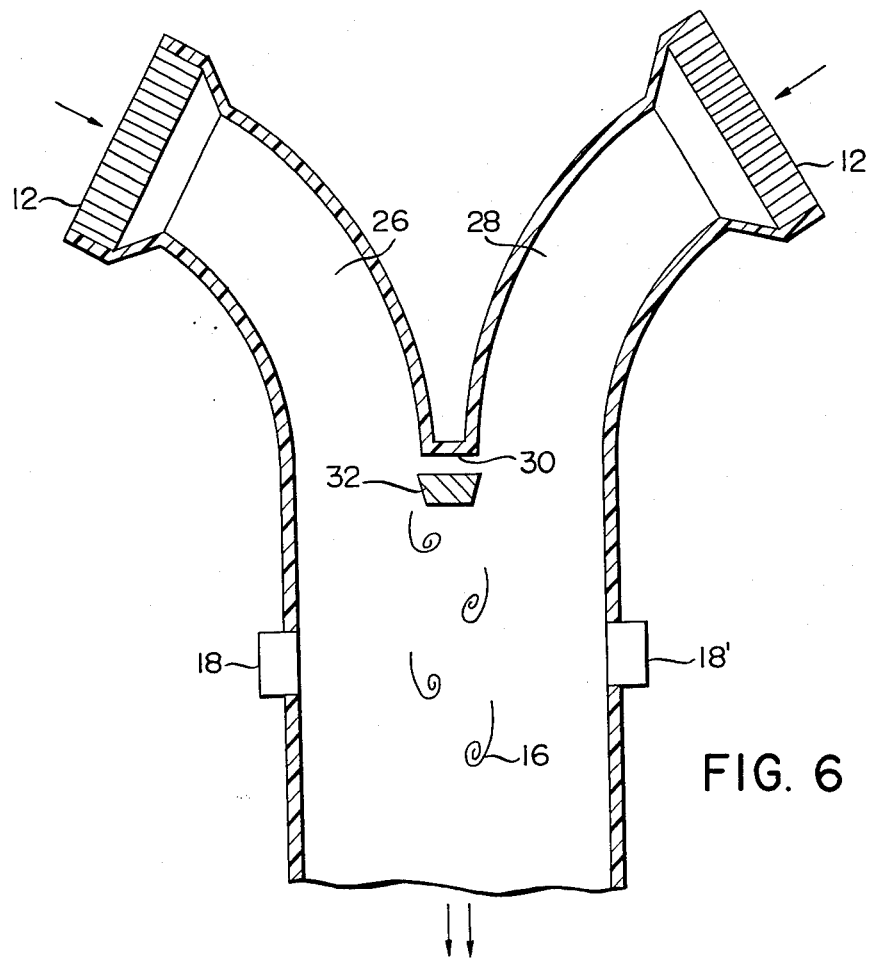
FIG. 6 is a view similar to FIG. 5 but illustrating another modification of the present invention.

In another modification of the present invention illustrated in FIG. 6 the pair of conduit portions 26 and 28 are curved so as to be gradually diverged away from each other toward the inlet portions thereof and the vortex stabilizer 32 is in the form of a rod having a cross section of an inverted trapezoid. While a single vortex stabilizer 32 is shown in FIG. 6 only for purposes of illustration, it is to be understood that a plurality of vortex stabilizers 32 in the form of rods may be disposed as shown in FIG. 2, or 5.

Figure 7:
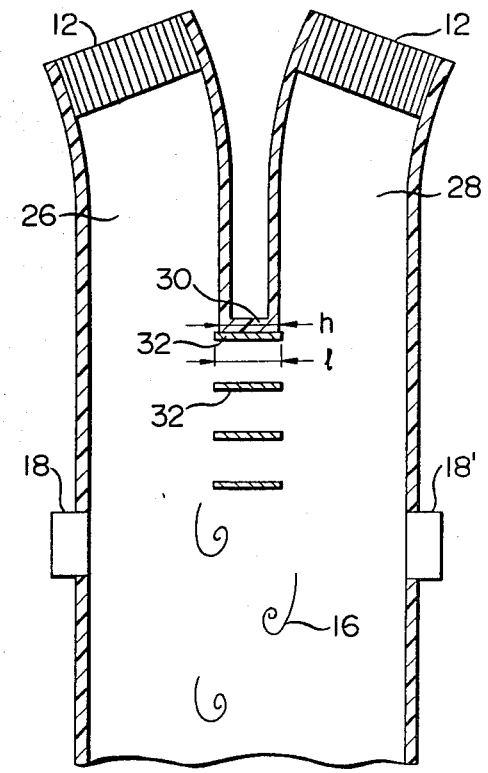
FIG. 7 is a view similar to FIG. 5 but illustrating still another modification of the present invention.

FIG. 7 shows still another modification of the present invention. The arrangement illustrated is different from that shown in FIG. 5 only in that in FIG. 7 the pair of conduit portions 26 and 28 have their inlet portions curved to be diverged away from each other and the connecting wall 30 has connected thereto the uppermost one, as viewed in FIG. 7, of a plurality of vortex stabilizers 32, in this case four stabilizers, disposed in the manner as described above in conjunction with FIG. 2. That vortex stabilizer 32 connected to the connecting wall 30 has a width l the ratio of which to the width h of the connecting wall 30 is not less than unity (1). This measure is effective for further stabilizing the generation of the Kármán's vortex street 16. It has been found that if the width h of the connecting wall 30 is greater than the width l of the vortex stabilizers 30, this results in an unstable generation of continuous vortices and therefore is not desirable. All the vortex stabilizers may be substantially equal in width to one another.

From the foregoing it is seen that the present invention provides a Kármán's vortex street flow meter comprising a pair of conduit portions for introducing a measured fluid thereinto, a vortex generating portion disposed at a junction where those portions of the measured fluid flowing through the pair of conduit portions respectively join each other and detection means disposed downstream of the vortex generating portion to detect the frequency at which vortices of a Kármán's vortex street are generated downstream of the vortex generating portion thereby to detect the flow speed or flow rate of the fluid to be measured. For detecting the flow speed or flow rate of the fluid inflowing in a pair of different directions through respective portions, the present invention can shorten the particular measuring conduit as compared with a conventional Kármán's vortex street flow meter or meters. Also since the vortex generating portion is disposed at the abovementioned junction where vortices are easily generated, the resulting structure is simplified because the vortex generating portion is formed of one part of walls of the the respective conduits as described above. Also the rectangular cross section of the conduit portions 26 and 28 is effective for forming the vortex generating portion 30 as described above. In addition a plurality of vortex stabilizers 30 in the form of strips or rods are effective to permit detecting of the flow speed or a flow rate of the fluid over a wide range of flow speeds or flow rates.

While the present invention has been illustrated and described in conjunction with a few preferred embodiments thereof it is to be understood that numerous changes and modifications may be resorted to without departing from the spirit and scope of the present invention. For example, the vortex stabilizer in the form of a rod may have any suitable cross section other than that illustrated. Also the vortex stabilizers may be omitted where there is only a small change in flow speed or flow rate of the fluid.

What is claimed is:
1. A Kármán's vortex street flow meter comprising:
a conduit means, the upstream end of said conduit means being a pair of upstream conduits having the upstream ends spaced from each other laterally of the conduit means for receiving a fluid to be measured thereinto, the downstream end of said conduit means being a single downstream conduit into which said upstream conduits merge, the walls of said upstream conduits forming a vortex generating portion between said upstream conduits at the junction where said upstream conduits merge into said single downstream conduit, and
a detector in said single downstream conduit and spaced downstream of said vortex generating portion for detecting the frequency at which vortices of a Kármán's vortex street are generated downstream of said vortex generating portion for use in determining the flow speed or flow rate of the fluid.

2. A Kármán's vortex street flow meter as claimed in claim 1 wherein said vortex generating portion is a transversely extending wall extending between the downstream end of the walls of said pair of upstream conduits.

3. A Kármán's vortex street flow meter as claimed in claim 2 further comprising at least one vortex stabilizer in said single downstream conduit spaced downstream of said vortex generating portion and upstream of said detector for stabilizing the generation of vortices of said Kármán's vortex street.

4. A Kármán's vortex street flow meter as claimed in claim 3 wherein said vortex stabilizer is a strip of material with the width thereof perpendicular to the direction of flow in said single downstream conduit.

5. A Kármán's vortex street flow meter as claimed in claim 3 wherein said vortex stabilizer is a rod having a trapezoidal cross-section with the parallel sides perpendicular to the direction of flow of fluid in said single downstream conduit.

6. A Kármán's vortex street flow meter as claimed in claim 3 wherein there is a plurality of vortex stabilizers in the form of strips of material with the width thereof perpendicular to the direction of flow of fluid and spaced at equal intervals from said vortex generating portion, and further comprising a further vortex stabilizer in the form of a strip connected to said transversely extending wall and having a width the ratio of which to the width of said conduit wall is not less than unity.

7. A Kármán's vortex street flow meter as claimed in claim 2 wherein said pair of upstream conduits have cross-sections substantially equal in area to each other.

8. A Kármán's vortex street meter as claimed in claim 1 in which said upstream conduits diverge in the upstream direction.

9. A Kármán's vortex street flow meter as claimed in claim 1 in which said upstream conduits are in spaced parallel relationship in the upstream direction.

10. A Kármán's vortex street flow meter as claimed in claim 1 further comprising a receiver having an air cleaner extending across the cross-section thereof, an air introduction port on one side of said air cleaner, and the upstream ends of said upstream conduits extending into said receiver on the other side of said air cleaner.

* * * * *